Figure 1:
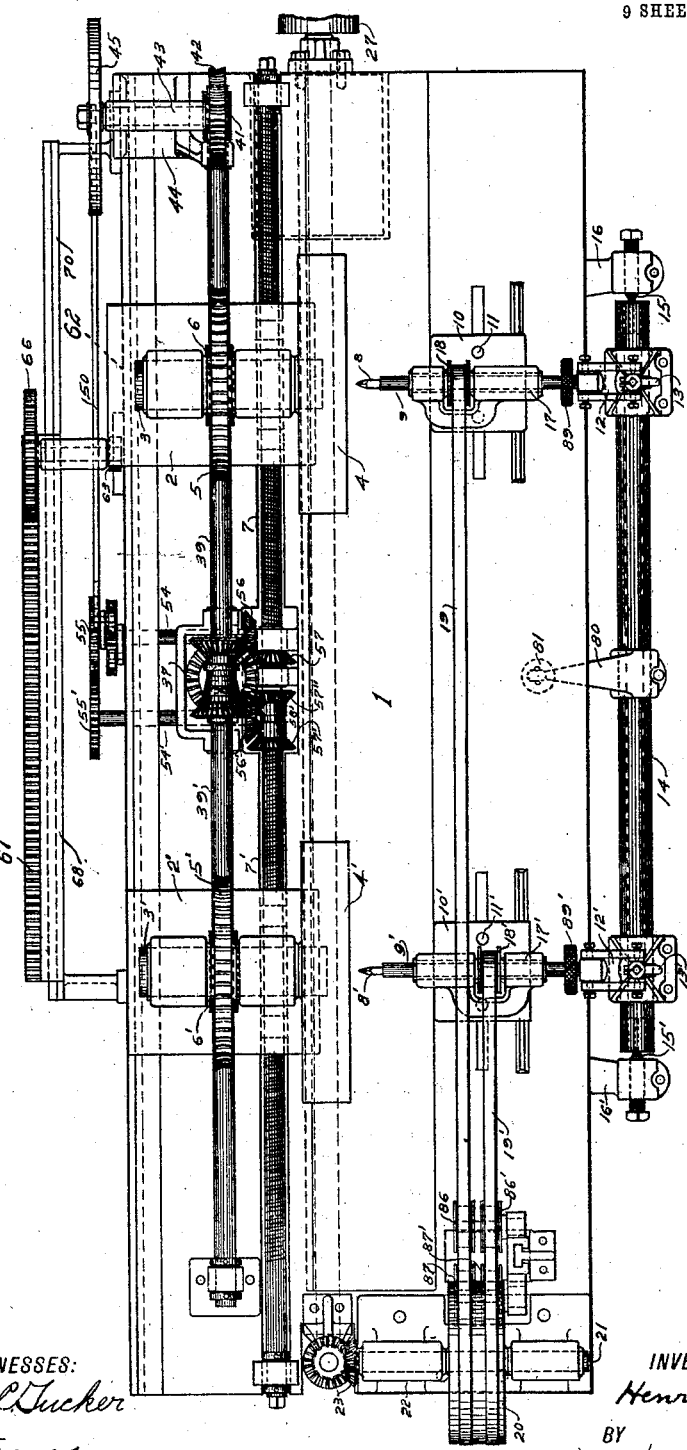

No. 842,697. PATENTED JAN. 29, 1907.
H. PHILLIPS.
MACHINE FOR ENGRAVING AND DIE SINKING.
APPLICATION FILED APR. 27, 1905.

9 SHEETS—SHEET 1.

WITNESSES:
Jas. C. Tucker
W. J. Evans

INVENTOR
Henry Phillips
BY
W. Hayden Evans.
ATTORNEY

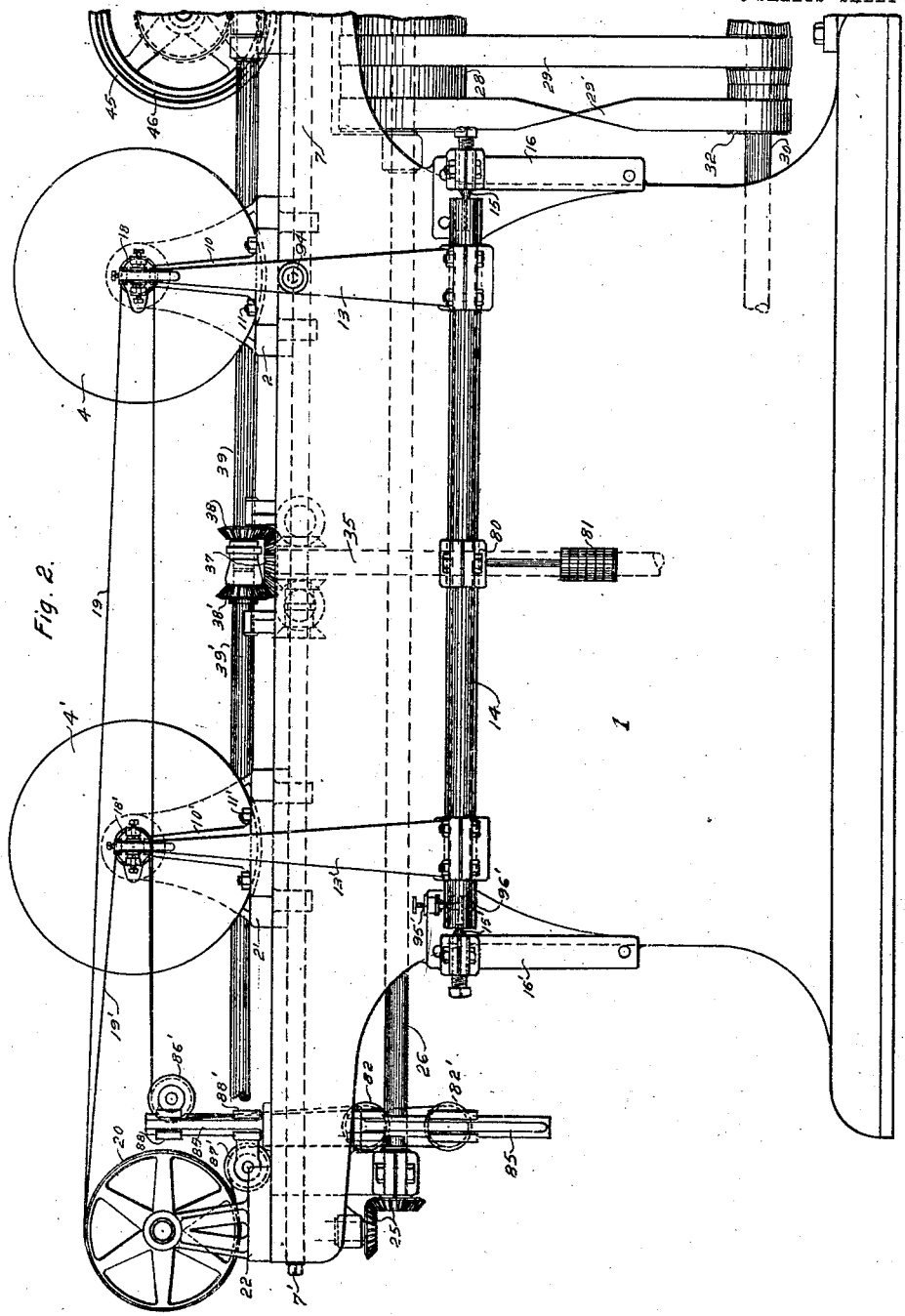

No. 842,697. PATENTED JAN. 29, 1907.
H. PHILLIPS.
MACHINE FOR ENGRAVING AND DIE SINKING.
APPLICATION FILED APR. 27, 1905.
9 SHEETS—SHEET 3.
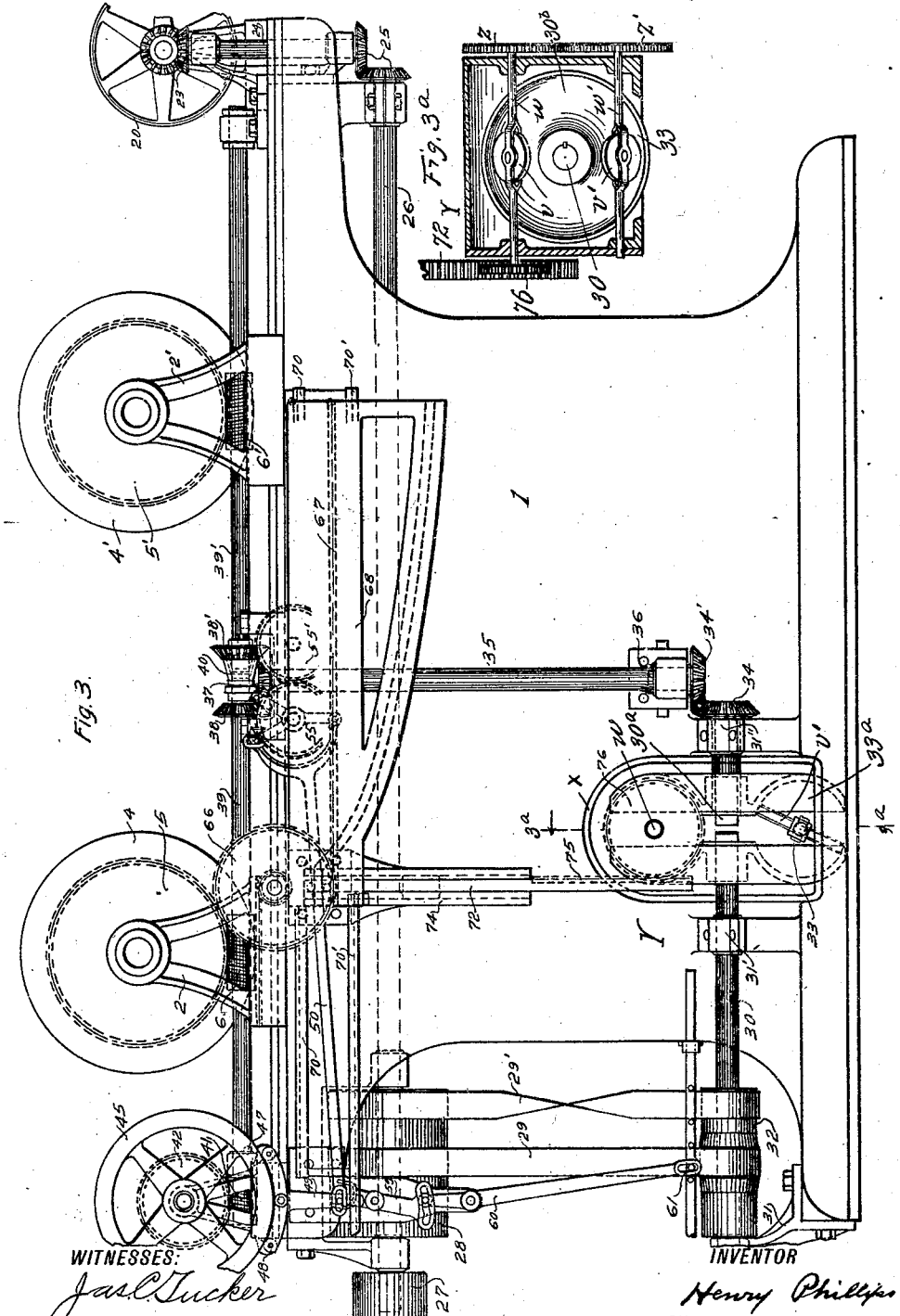

No. 842,697. PATENTED JAN. 29, 1907.
H. PHILLIPS.
MACHINE FOR ENGRAVING AND DIE SINKING.
APPLICATION FILED APR. 27, 1905.
9 SHEETS—SHEET 4.
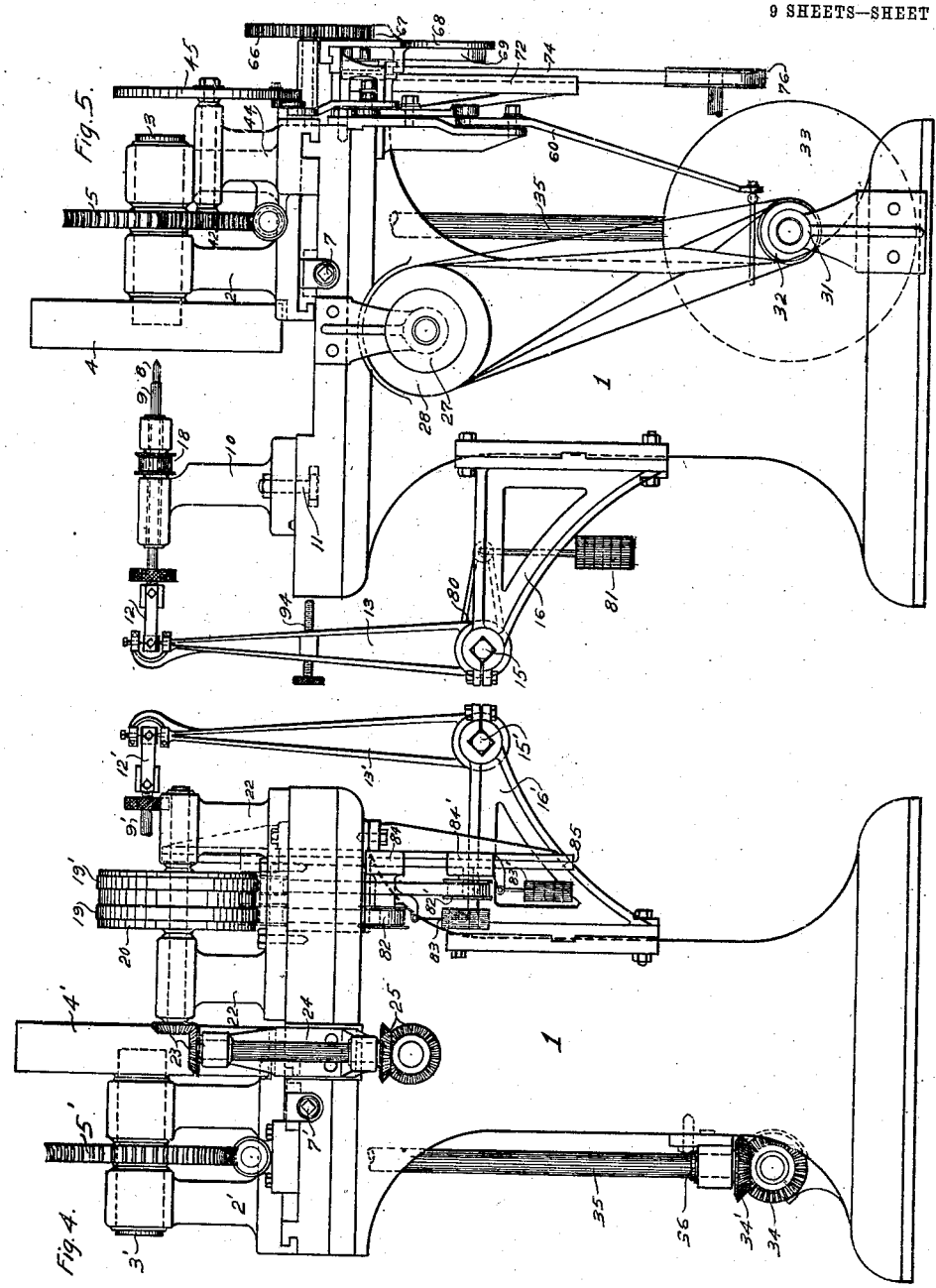
WITNESSES:
Jas C. Tucker
H. J. Evans.
INVENTOR
Henry Phillips
BY
H. Hayden Evans,
ATTORNEY No. 842,697. PATENTED JAN. 29, 1907.
H. PHILLIPS.
MACHINE FOR ENGRAVING AND DIE SINKING.
APPLICATION FILED APR. 27, 1905.
9 SHEETS—SHEET 5.
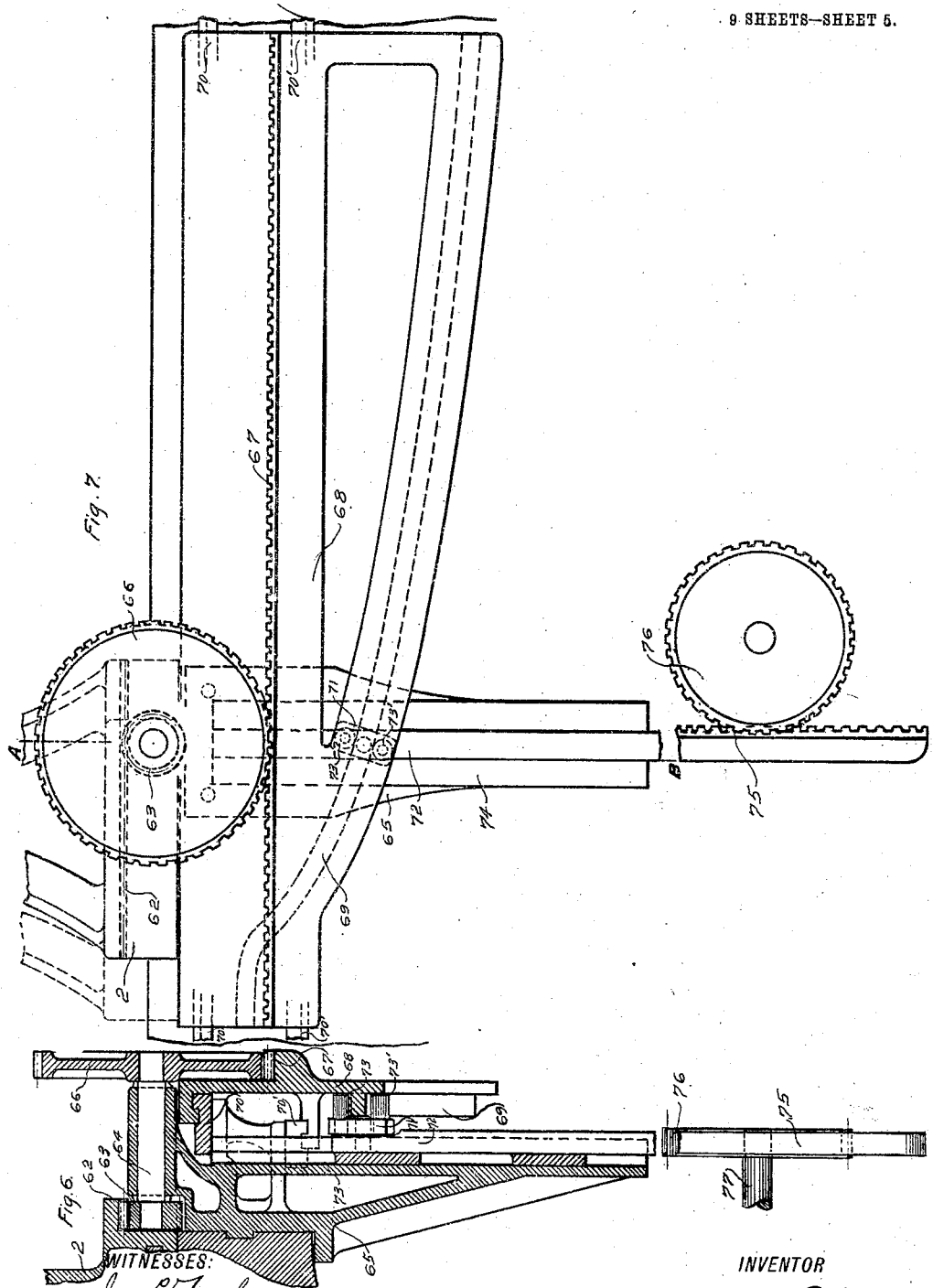
INVENTOR
Henry Phillips
BY
W. Hayden Evans
ATTORNEY
WITNESSES:
Jas. C. Tucker
H. J. Evans.

No. 842,697. PATENTED JAN. 29, 1907.
H. PHILLIPS.
MACHINE FOR ENGRAVING AND DIE SINKING.
APPLICATION FILED APR. 27, 1905.
9 SHEETS—SHEET 6
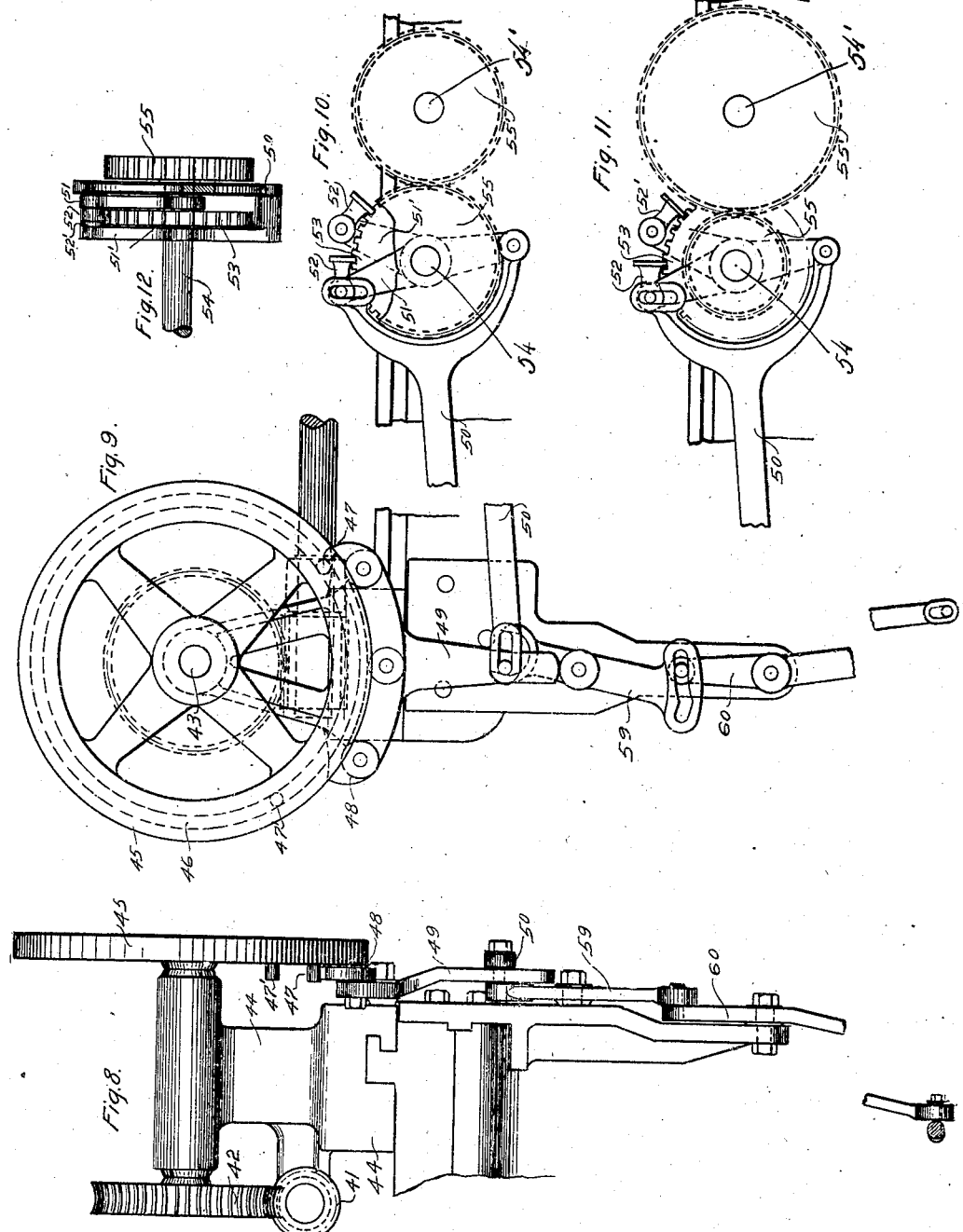
WITNESSES:
Jas. C. Tucker
H. J. Evans
INVENTOR
Henry Phillips
BY
H. Hayden Evans,
ATTORNEY No. 842,697. PATENTED JAN. 29, 1907.
H. PHILLIPS.
MACHINE FOR ENGRAVING AND DIE SINKING.
APPLICATION FILED APR. 27, 1905.
9 SHEETS—SHEET 7.
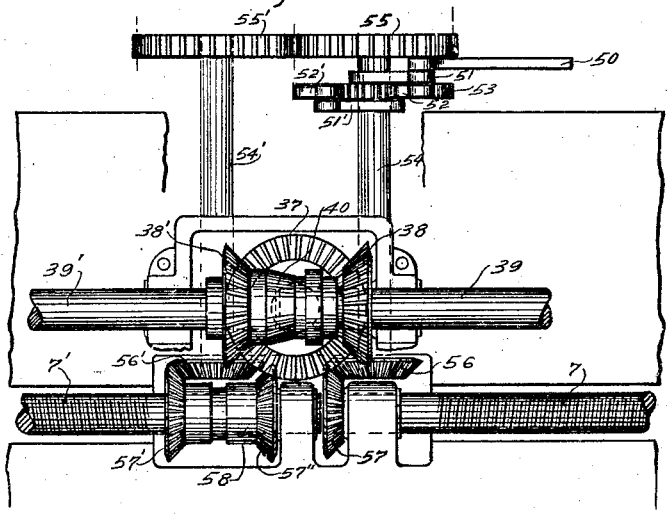
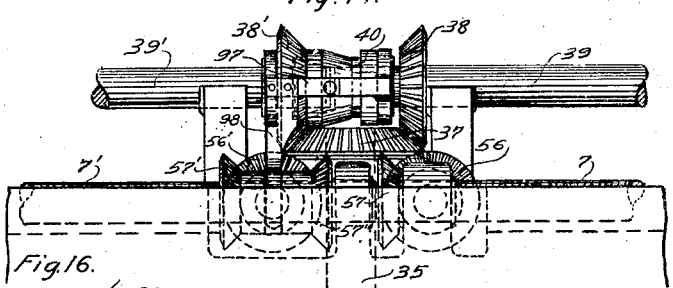
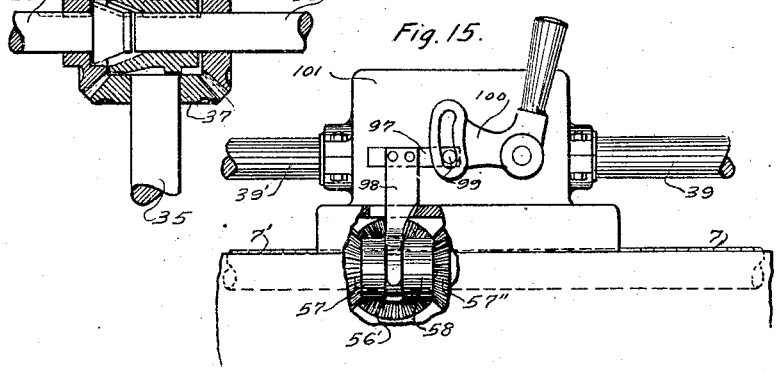
WITNESSES:
INVENTOR
Henry Phillips
BY
H. Hayden Evans,
ATTORNEY No. 842,697. PATENTED JAN. 29, 1907.
H. PHILLIPS.
MACHINE FOR ENGRAVING AND DIE SINKING.
APPLICATION FILED APR. 27, 1905.
9 SHEETS—SHEET 8.
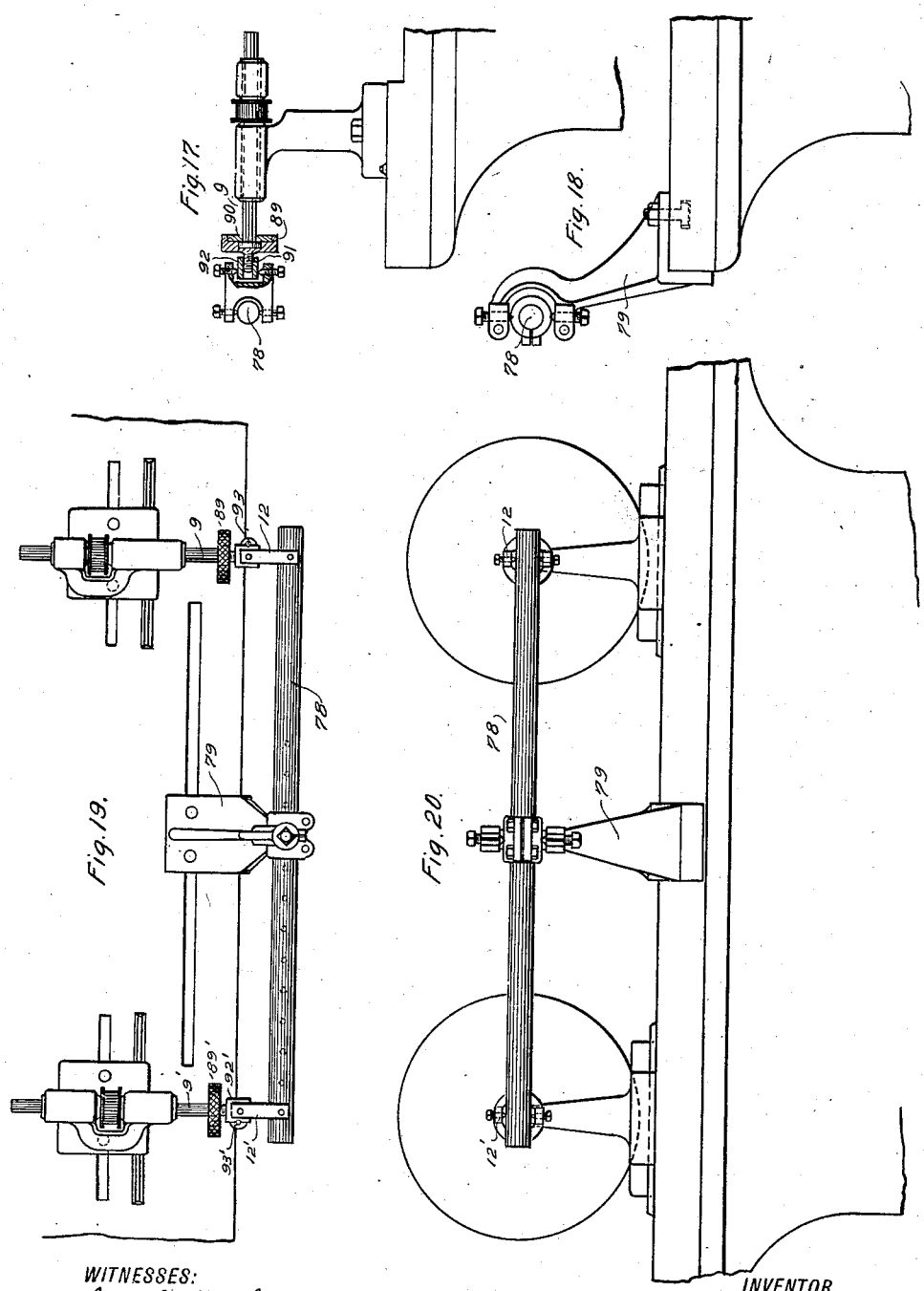
WITNESSES:
INVENTOR
Henry Phillips
BY
Hayden Evans
ATTORNEY No. 842,697. PATENTED JAN. 29, 1907.
H. PHILLIPS.
MACHINE FOR ENGRAVING AND DIE SINKING.
APPLICATION FILED APR. 27, 1905.
9 SHEETS—SHEET 9.
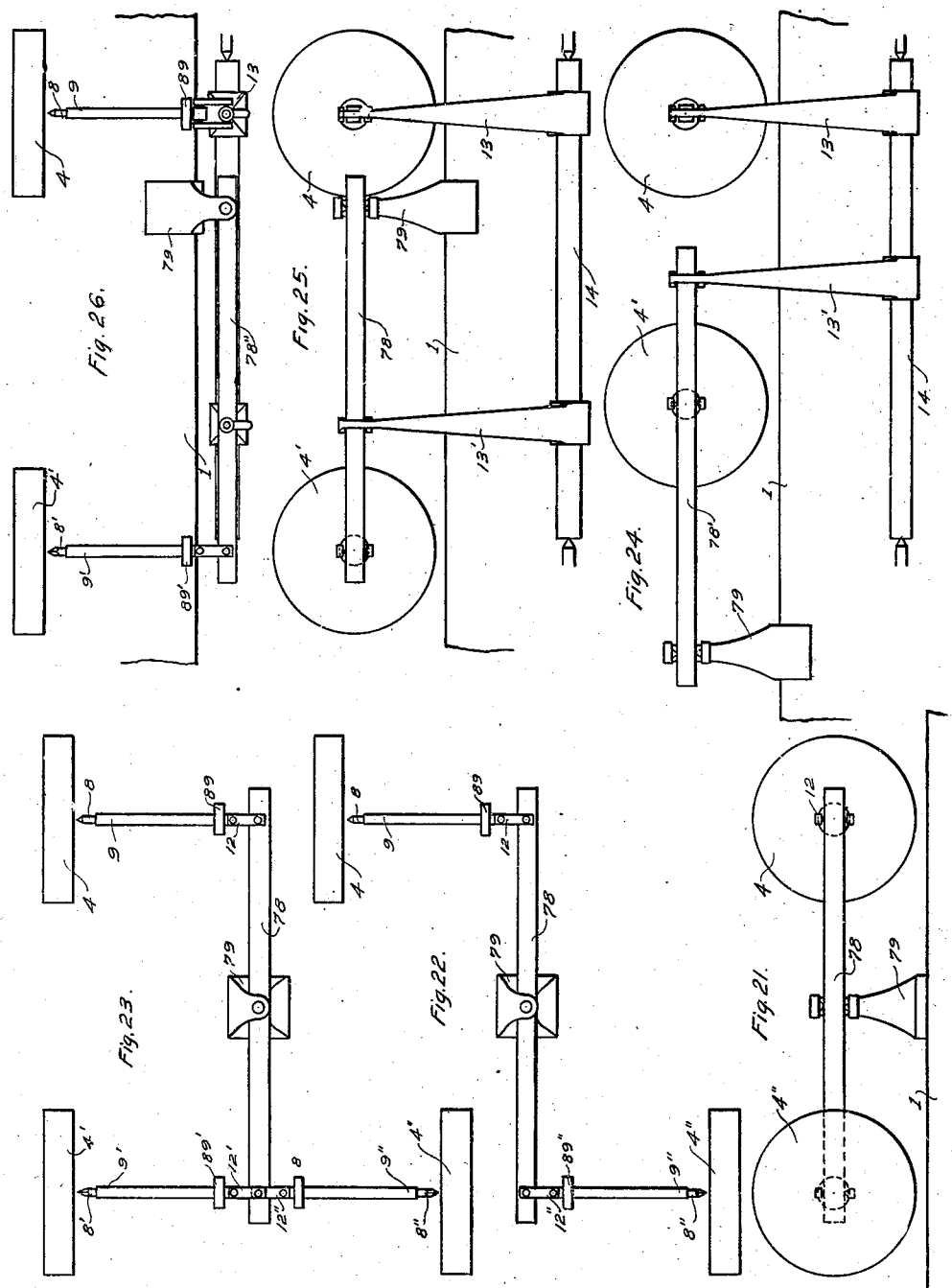
WITNESSES:
Jas. C. Tucker
H. J. Evans.
INVENTOR
Henry Phillips
BY
W. Hayden Evans,
ATTORNEY

UNITED STATES PATENT OFFICE.

HENRY PHILLIPS, OF SCRANTON, PENNSYLVANIA.

MACHINE FOR ENGRAVING AND DIE-SINKING.

No. 842,697.  Specification of Letters Patent.  Patented Jan. 29, 1907.

Application filed April 27, 1905. Serial No. 257,601.

*To all whom it may concern:*

Be it known that I, HENRY PHILLIPS, a citizen of the United States, residing in the city of Scranton, in the county of Lackawanna and State of Pennsylvania, have invented a new and useful Improvement in a Machine for Engraving and Die-Sinking, of which the following is a specification.

My invention relates to improvements in engraving and die-sinking machines in which a cutting-tool is caused to move in a manner defined by the movements of a tracer following the contour of a model; and the objects of my improvements are to provide mechanism whereby a cutting tool or tools may be caused to produce a copy of a pattern or model enlarged, reduced, or in duplicate, or of the opposite hand, and capable of making a copy in intaglio from a model in relief, or vice versa.

It has been hitherto found difficult or impossible to produce with the machines in actual use exact copies of the model or templet either enlarged or reduced, positive or negative, right or left hand, from the same model, which may be either positive or negative, male or female, right or left hand, or to vary the size in desired and direct ratio.

My invention is intended to accomplish these results, as well as to produce all that can be done by former inventions in this class of machines. It also possesses many improvements in its general mechanism.

I attain these objects by the mechanism shown in the accompanying drawings, in which—

Figure 1 shows a plan of the machine. Fig. 2 is a front elevation. Fig. 3 is a rear elevation of the machine, the rear side of the housing for the speed-changing device being omitted. Fig. 3ª is a section on the line 3ª 3ª of Fig. 3 with the rear side of the housing in position. Fig. 4 is a left-hand end elevation, and Fig. 5 is a right-hand end elevation, of the machine. Figs. 6 and 7 show a mechanism for controlling the speed-changing device, Fig. 7 being an elevation and Fig. 6 a sectional view taken on line A B of Fig. 7. Figs. 8 and 9 are end and side elevations showing the mechanism for giving a horizontal feed to the revolving heads or chucks and for shifting the belts for reversing the machine. Fig. 10 shows a part of the feed mechanism of Figs. 8 and 9. Fig. 11 shows the same mechanism as Fig. 10 with change-gears of different sizes for varying the feed. Fig. 12 is an end view of Fig. 10. Figs. 13 and 14 are respectively a plan and an elevation of the gears and clutches connecting the feed and drive with the feed-screws and driving-shafts and for varying the direction of the same. Fig. 15 shows a casing for the gears, &c., shown in Fig. 14, also the clutch-actuating mechanism. Fig. 16 is a sectional view of the clutch shown in Figs. 13 and 14. Fig. 17 shows means for adjusting the tool or tracer-spindle and its manner of attachment to a horizontal oscillating bar. Fig. 18 shows the manner of pivoting the horizontal oscillating bar, and Figs. 19 and 20 are a plan and elevation showing the general manner of arranging the horizontal oscillating bar. Figs. 21 to 26, inclusive, are diagrammatic views showing different relative arrangements of the tool and tracer-spindles for doing different kinds of work.

On a suitable bed 1 are mounted two or more head-stocks, as 2 2', respectively, carrying horizontal spindles 3 and 3', having, respectively, heads or chucks 4 4' upon one end, to one of which is attached the model or templet and to the other the work-piece which is to be engraved or sunk. The said spindles 3 3' are parallel to each other and are caused to rotate in suitable bearings in the head-stocks 2 2' by means of the worm-wheels 5 5', thus revolving the model and die before the tracer and cutting-tool, respectively. The head-stocks 2 2' are moved horizontally toward or away from each other by means of feed-screws 7 7', hereinafter described. Thus as the heads revolve the tracer and cutter may be fed from the center to the periphery or reversely.

Opposite to and on a level with the center of each head or chuck is the tracer 8 or cutting or milling tool 8', as it may be, mounted in a spindle 9 or 9' and caused to rotate, as hereinafter explained, in suitable bearings in a standard 10 or 10', adjustably attached to the bed by T-head bolts 11 11', so as to admit of horizontal adjustment of the standards parallel to the faces of the heads 4 4'.

To the outer or opposite ends of these spindles 9 9' I attach by universal joint 12 12' vertical arms 13 13', one to each, which are rigidly clamped to a horizontal shaft 14, mounted upon center 15 15' at each end, supported by brackets 16 16', attached to the front of the bed 1. The said spindles 9

9' are feathered in sleeves or bushings 17 17', which are attached to or formed integral with the hubs of the flanged pulleys 18 18', about which pass the belts 19 19', giving rotary motion to the pulleys 18 18', sleeves or bushings 17 17', and spindles 9 9' in the bearings in the standards 10 10'.

The spindle 9 reciprocates in bushing 17 as the tracer 8 passes into or out of the forms of the model or templet, and thus imparts an oscillating movement to the upright arm 13 and to the horizontal shaft 14. The other upright arm 13' being rigidly attached to the shaft 14 must oscillate similarly, thus giving a similar longitudinal movement to the other rotating spindle 9', carrying the tool 8', so as to cause it to cut lines in the metal similar to those traced on the form of the model by said tracer 8.

The belts 19 19' are driven from a larger driving-pulley 20, attached to a shaft 21, revolving in bearings in a standard 22, mounted on one end of the bed 1, said shaft 21 being revolved by bevel-gears 23 and a vertical shaft 24 (see Fig. 3) receiving motion through another pair of bevel-gears 25 from the driving-shaft 26, which passes longitudinally through the bed of the machine and receives its motion by belt-pulley 27 from the main shaft, motor, or other source of power.

To the driving-shaft 26, which passes longitudinally through the bed, I attach a wide pulley 28, Fig. 3, about which pass two belts, one straight 29 and one crossed 29', transmitting motion to shaft 30 below and at the rear of the machine, supported in suitable bearings 31 31' 31", attached to or integral with the base of the machine. On the latter are tight and loose pulleys or their equivalent 32, arranged in the ordinary manner for reversing motion, so that while one belt is transmitting motion the other is not. This may be varied to suit any recognized method of receiving and transmitting power.

The shaft 30 is connected to one member of a suitable speed-changing device. In Figs. 3 and 3$^a$ a well-known form of speed-changing device Y is shown, consisting of two opposing disks 33 and 33$^a$, the former being secured to the shaft 30 and the latter to a short shaft 30$^a$, which carries a bevel-gear 34. The adjacent faces of the disks have semicylindrical annular grooves 30$^b$, between which are arranged friction wheels or rollers $v$ $v'$, the peripheries of which are adapted to bear upon both disks. These wheels or rollers are carried by shafts $w$ and $w'$, journaled in a suitable housing $x$ and extending between the disks midway between the hubs and peripheries of the disks. The friction-wheels are pivoted upon axes at right angles to the shafts which support them, so that the wheels may be turned by the shafts at any desired angle and made to bear upon different portions of the grooved faces of the disks. Gears $z$ $z'$ of equal diameter connect the shafts $w$ and $w'$, so that the shafts carrying the friction-wheels will turn simultaneously in opposite directions, as is necessary in this form of device to make both friction-wheels bear upon like parts of the disks and to operate together. These shafts are turned to automatically vary the speed of the driven disk 33$^a$, as will be hereinafter more fully explained, by a sliding rack 72, which engages a gear-wheel 76 upon the shaft $w$. The bevel-gear 34 upon the shaft 30$^a$, which is connected to the driven disk, engages another bevel-gear 34', attached to an upright shaft 35, revolving in suitable bearings and supported vertically by a collar or shoulder 36 on the shaft, above one or both of its bearings. At the upper end of said upright shaft 35 is attached a bevel-gear 37, Figs. 13 and 14, which engages bevel-gears 38 38' on two horizontal shafts, one, 39, Fig. 3, passing longitudinally with respect to the bed 1, through the head-stock 2, Fig. 3, upon which is mounted the model, and driving the worm-wheel 5 by a worm 6, keyed to slide upon said shaft 39, the other, 39', passing similarly through the other head-stock 2' or head-stocks, rotates worm-wheel 5' by a worm 6' keyed thereon.

It will be seen that the horizontal shafts 39 and 39' rotate in opposite directions, since the bevel-gears 38 38' engage the bevel-gear 37 on opposite sides. Hence the worms 6 and 6' are respectively right and left hand, so that the heads 4 4' revolve in the same direction.

In order to be able to revolve the heads in opposite directions, I have provided a clutch arrangement 40, Fig. 16, between the ends of the shafts 39 39', which when thrown over to the left disengages bevel-gear 38' from gear 37 and couples the shaft 39' to the other shaft 39, so that the two then rotate as one shaft, receiving its motion through the one gear 38 from the gear 37, keyed to the upright shaft 35.

On the outer end of the shaft 39, Fig. 1, which revolves the head carrying the model, is formed or mounted another worm 41, which through a worm-wheel 42 drives a horizontal shaft 43, parallel to the spindle 3, carrying the head 4, and so geared that its revolutions are at exactly the same rate as that of the heads 4 4'. To this shaft 43, which is carried in suitable bearings in a standard 44, mounted upon the bed 1 and on the end opposite to the worm-wheel 42, is attached a tappet-disk 45, Figs. 1, 2, 8, 9, having a concentric groove 46 in its face near the periphery of the disk in which may be adjustably secured a pin or pins 47, which as they are carried around operate a rocking device 48, carrying a downwardly-projecting lever 49, to which is attached by a pin-and-slot connection a connecting-rod 50, yoked at its outer end, the arms of the yoke being pivotally connected to the pawl-levers 51 51', carrying pawls 52 52', adapted to engage with a ratchet-wheel 53, mounted on a shaft 54, Figs. 1, 13, journaled in the bed near the middle. Said shaft carries a spur-gear 55, Figs. 10–13, which meshes with a similar gear 55', mounted on a shaft 54', parallel to shaft 54. These two shafts 54 54' are horizontal and extend toward the middle of the bed from the rear and at right angles to the length of the bed. Upon their inner ends are attached, respectively, bevel-gears 56 56', gear 56 engaging a bevel-gear 57 on the feed-screw 7, the other gear 56' engaging with a bevel-gear 57', attached to a sleeve 58, keyed to the feed-screw 7'. Thus arranged, with the thread on one feed-screw cut right-handed and the thread on the other cut left-handed, the head-stock fed by each will move in the same direction. On the other end of the sleeve 58, Fig. 13, is attached another bevel-gear 57" and so set that a movement of the sleeve 58 along the feed-screw 7' toward the left will disengage the bevel-gear 57' from the driving-gear 56' and engage the bevel-gear 57" therewith, thus reversing the direction of the feed-screw 7' and the head-stock 2' or head-stocks thereto attached. The gears 55 55' on the outer ends of the two shafts 54 54' are change-gears, and by substituting others of different rotative sizes any desirable ratio of feeds may be obtained. Fig. 11 illustrates the use of change-gears 55 55' of different ratio.

The rocking device 48 previously referred to is also arranged to operate a cam 59, which throws over a lever 60, the lower end of which operates a belt-shipper 61 to shift the belts 29 29' in thus reversing the rotation of the heads 4 4'. The rocking device 48 is alternately actuated by two pins 47 47', mounted in the grooves 46 in the disk 45, before mentioned, at such positions as will engage said rocking device 48 at the desired time to give any required range of oscillations to the heads 4 4'. The connection between said rocking device 48 and the pawls, ratchet, &c., 51 to 53, is so arranged that the alternating motion given to the heads 4 4' does not change the horizontal feed of the heads—that is, the horizontal feed of the heads continues in the same direction. This I accomplish by using the two pawl-arms 51 51' and the two pawls 52 52'. The pawl-arm 51' extends below the shaft 54, upon which it turns, and is attached to the connecting-rod 50 on the end opposite to the pawl 52'. The pawl-arm 51 projects upwardly from shaft 54 and is attached to connecting-rod 50 at the same place as pawl 52. When rod 50 moves forward, the pawl 52 is engaged with the ratchet-wheel 53 and pawl 52' is released. When the connecting-rod 50 moves backward, pawl 52 is released and pawl 52' engages the ratchet-wheel 53. Thus in either case the ratchet-wheel 53 is moved forward and operates the feed.

To vary the revolving speed of the heads, the device shown in Figs. 1, 2, 6, and 7 is provided. On the rear of the head-stock 2 carrying the model is attached or formed a horizontal rack 62, which engages a small spur-gear 63, keyed to a short horizontal shaft 64, carried in a bearing formed in bracket 65, attached to bed 1. On the outer end of said shaft 64 is a larger spur-gear 66, which engages a horizontal rack 67, attached to or formed integral with a frame 68, Figs. 6, 7, carrying a cam-guide 69. The frame 68 is adapted to move horizontally on stationary slides or guides 70 70', attached to the bed. When the head-stocks 2 2' move horizontally to move the tracer and cutter 8 8' radially relatively to the chucks or heads 4 4', the rack 62 engages gear 63, which turns shaft 64 and gear 66, and the latter, engaging rack 67, gives a horizontal movement to the frame 68.

A short arm 71, swiveled at its middle point to the upper end of a vertical slide 72, carries two small rollers 73 73', which engage the opposite sides of cam-guide 69, so that when frame 68 moves horizontally the said cam-guide will give a vertical movement to the slide 72, which is mounted between vertical guides 74. The slide 72 is provided at its lower end with rack-teeth 75, engaging a spur-gear 76, so that the vertical movement of the rack 75 will turn gear 76, which is attached to a shaft 77, controlling the transmitting-rollers in the speed-changing mechanism $y$, Fig. 3. The cam-guide 69 is intended to be so designed as to cause the speed-changing mechanism to maintain nearly, if not exactly, a constant cutting speed as the tool and tracer move radially of the die and model. To produce an exact copy of a model, engraved or sunk, the machine will be set substantially as shown in Figs. 1, 2, 3, with the heads 4 4' revolving in the same direction and the head-stocks 2 2' feeding horizontally in the same direction at the same rate.

To produce a right-hand die from a model of a left-hand die, or vice versa, the heads 4 4' revolve in opposite direction and head-stocks 2 2' feed in the opposite directions and at the same rate.

To produce a male die from a female model and a positive figure from a negative model, or vice versa, of the same size, larger or smaller than the model, I arrange my machine substantially as follows:

A bar 78, Figs. 19, 20, is pivoted at its center or at any desired point between its extremities, so as to admit of horizontal oscillations, and is supported on a standard 79, mounted on the bed 1, attached thereto by T-head bolts and admitting of horizontal adjustment in order to pivot the bar at any desired point between the extremities of said bar. Said horizontal oscillating bar 78 is so situated as to be attached at one end by a universal and swivel joint 12 to the revolving spindle 9, carrying the tracer 8, and at its other extremity is similarly attached to the other revolving spindle 9', carrying the tool 8', the upright arms 13 13' in both cases being detached from spindles 9 9'. Thus the movements of the tracer 8 through the horizontal oscillating bar 78, which is pivoted so as to form a fulcrum between its ends, are reversed on the cutter 8', which is caused to cut a male die from a female model, or vice versa, and a positive figure from a negative model, or vice versa.

Should it be desired to cut a die of the same size as the model, the bar 78 is pivoted at its middle point, as shown in Figs. 19, 20. If of different size than the model, the fulcrum is so adjusted horizontally as to make the ratio between the length of the end of bar 78, attached to spindle 9, carrying the tracer 8, to the length of the other end of said bar attached to the spindle 9', carrying the cutter 8', equal to the ratio between the size of the model and the size of the die or figure desired, the horizontal feed having been proportioned by means of the change-gears 55 55', as before explained.

To produce a reduced or enlarged copy of a model either in duplicate or from right to left hand, or vice versa, with the horizontal oscillating bar 78, I place head 4, carrying the model and head 4'', carrying material to be engraved or sunk, as shown in Figs. 21, 22—i. e., on opposite sides as well as opposite ends of oscillating bar 78—so that any longitudinal movement of spindle 9 caused by tracer 8 following in and out of depressions and elevations of the model on head 4 will oscillate bar 78, which gives a corresponding movement to spindle 9'' and tool 8'', cutting an exact copy of model when fulcrum 79 is placed at the center of bar 78 and heads 4 and 4' have the same horizontal feed and the same revolutions.

When an enlarged or reduced size is desired, the pivot of pivoting bar 78 is adjusted so that the arms of bar 78 are proportional to the amount of enlargement or reduction desired, and the horizontal feed of the heads 4 4' is also proportioned by arranging the change-gears 55 55'.

In Fig. 23 I show in plan my combination of the arrangement shown in Fig. 19 and that shown in Fig. 22, whereby the work done by both is performed in one operation.

In Fig. 24 I show the manner of arranging an oscillating bar 78' for making reduced copies of a model or a reduced right-hand die from a model of a left-hand die, or vice versa, with both the model and the work on the same side of the bar. The bar 78' is pivoted at one end, the upright arm 13' is attached at the other end, and the spindle carrying the cutting-tool is attached at some intermediate point on bar 78', according to the reduction desired. The horizontal feed of the revolving heads are also proportioned as previously described.

In Figs. 25, 26 I show the manner of arranging a bar 78'' for making enlarged copies of a model, or of right or left hand dies with both model and work on the same side of the bar. The horizontal bar 78'' is pivoted at one end, the spindle carrying the tool is attached to the other end, and the upright arm 13' is attached at some intermediate point on the bar, according to the proportion of enlargement desired. The feed is proportioned as before described.

In Figs. 1, 2, 5 is shown an arm 80, clamped to the horizontal shaft 14, with a counterweight 81 suspended from its end. This weight may be varied to suit the pressure desired to hold the tracer 8 to the contour of the model and the tool 8' to the work.

In cases where the horizontal oscillating bar 78 is used without the upright arm 13' attached thereto other means for a counterpoise must be provided. To accomplish this, I suspend a weight from a cord which passes over a pulley attached to the standard 10 and secure the cord to the bar 78 at or near the end joined to the spindle 9, carrying the tracer 8. This counterpoise (not shown in the drawings) is so situated that it will hold the tracer 8 to the face of the model and the tool 8' or tools to the work. In the same cases to regulate the range of oscillations or depth of cut I provide a stop arrangement similar in principle to 94. (Shown in Fig. 5.) A stop-screw is screwed through a lug clamped to the bar 78 at or near the end joined to the spindle 9 and meets a lug or other projection attached to or integral with the standard 10.

In Figs. 2 and 4 is shown a belt tension which consists of pulleys 82 82', to which are suspended weights 83 83', and about which pass the belts 19 19', respectively. Each pulley has a slide 84 84', adapted to move freely on the vertical guide 85. The belts in passing to and from the pulleys 82 82' pass over the pulleys 86 86' and 87 87', Fig. 1. Pulleys 86 86' are on the same pin attached to the slide 88, Fig. 2, which is clamped to the guide 85, as shown in Fig. 2. Pulleys 87 87' are similarly attached to slide 88', which is also clamped to guide 85. Both slides 88 88' may be adjusted vertically on the guide 85.

In Fig. 17 is shown in detail an arrangement whereby the tool or tracer may be adjusted longitudinally. The spindle 9 is swiveled in the small milled hand-wheel 89 by a washer 90, which has an annular thread on its outside adapted to screw into the recess in the hand-wheel 89, substantially as shown. The hand-wheel 89 has a threaded stem 91, which screws into the sleeve or block 92. To adjust the tool or tracer longitudinally, this screw 91 may be turned in or out of the sleeve 92 by the hand-wheel 89, as desired. The sleeve 92 is split, so that when the adjustment has been made the screw 91 may be clamped by a small set-screw or bolt in the sleeve, as indicated at 93, Fig. 19. This adjusting device is fitted on both the spindle 9, carrying the tracer, and on the spindle or spindles 9', carrying the tool.

In Figs. 2–5 is shown a stop-screw 94, which screws through the arm 13 and is adapted to meet the edge of the bed 1. This provides for adjusting the depth of the cut on the work by stopping the arm 13 when the end of the screw 94 meets the edge of the bed 1. The depth of the cut may be varied by turning the screw 94.

In Fig. 2 is shown a compression grease-cup 95', which may be provided for lubricating the center-point bearings of the shaft 14. The cup 95' is attached to the upper side of the shaft 14, so that the grease passes through a small hole drilled into the shaft and into the bearing-block 96', which is fitted into the end of the shaft 14, said shaft being hollow. At the center of the conical bearing a small hole is drilled longitudinally part way through and meets the hole leading to the grease-cup. Thus the grease is forced through and outward against the point of the pin 15'. This lubricating device is provided also for the other bearings of the shaft. Suitable lubrication is provided at all bearings and engaging points throughout the machine.

Fig. 15 shows a covering 101, provided for the gears, (shown in Figs. 13 and 14,) also an arrangement for throwing over the clutch 40 (shown in section in Fig. 16) and the sleeve 57, previously described. A forked arm 97, Fig. 14, engages the clutch 40 and bevel-gear 38'. To its outer side is attached another forked arm 98, which engages the sleeve 58. In the arm 97 is a pin 99, which engages with the cam 100, which is so constructed that a movement of the cam 100 toward the left will force the two forks 97 and 98 to the left. This operation disengages gear 38', and engaging clutch 40 also forces over the sleeve 58, disengaging the gear 57' and engaging the gear 57'' with gear 56'. By using two cams, one for arm 97 and one for arm 98, the latter being detached from arm 97, clutch 40 and sleeve 58 may be operated independently of each other when desired.

While the above-described machine is the preferred embodiment of my invention, I do not wish to be limited to the exact construction shown and described, but believe my invention to be of the scope expressed in the following claims.

I claim—

1. In an engraving-machine, the combination with rotary pattern and work-carrying heads, stationary bearings, and tracer and tool spindles movable endwise, and in substantially the same plane, in said bearings, toward and from said heads, respectively, of a bar pivoted to swing about an axis transverse to the bar and perpendicular to the plane of movement of said spindles, and connections between said spindles and bar whereby the reciprocatory movements of said spindles are caused to bear a certain definite relation to each other.

2. In an engraving-machine, the combination with rotary pattern and work-carrying heads, stationary bearings and tracer and tool spindles movable endwise, and in substantially the same plane, in said bearings, toward and from said heads, respectively, of a bar pivoted to swing about an axis transverse to the bar and perpendicular to the plane of movement of said spindles and swivel connections between said spindles and bar whereby the reciprocatory movements of said spindles are caused to bear a certain definite relation to each other.

3. In an engraving-machine, the combination with tracer and tool spindles reciprocable endwise in substantially the same plane, of a bar pivoted to swing in the plane of movement of said spindles, and swivel connections between said spindles and bar whereby the reciprocatory movements of said spindles are caused to bear a certain definite relation to each other.

4. In an engraving-machine, the combination with tracer and tool spindles reciprocable endwise in substantially the same plane of a bar pivoted to swing about an axis perpendicular to the plane of movement of said spindles and swivel connections between said spindles and bar whereby the reciprocatory movements of said spindles are caused to bear a certain definite relation to each other.

5. In an engraving-machine, the combination with tracer and tool spindles reciprocable endwise in substantially the same plane of a bar pivoted to swing about an axis perpendicular to the plane of movement of said spindles, a swiveled connection between said bar and one of said spindles, an oscillatory shaft having an arm connected to the other of said spindles and having another arm attached by a swiveled connection to said bar.

6. In an engraving-machine, the combination with tracer and tool spindles reciprocable endwise in substantially the same plane of a bar pivoted to swing about an axis perpendicular to the plane of movement of said spindles, a swiveled connection between said bar and one of said spindles, an oscillatory shaft having an arm connected to the other of said spindles and another arm attached at one end to said shaft and having a swiveled connection at its other end with said bar between the pivot of the latter and its point of connection to said first-mentioned spindle.

7. In an engraving-machine, the combination with endwise-movable, tool and tracer spindles, means to cause the longitudinal movement of said spindles to be interdependent, rotary pattern and work-carrying heads, means to rotate said heads, means to feed said heads laterally, and means operated by the lateral movement of one of said heads to vary the speed of rotation of said heads.

8. In an engraving-machine, the combination with endwise-movable, tool and tracer spindles and means to cause the longitudinal movements of said spindles to be interdependent, of pattern and work-carrying heads, driving means therefor, means operated by said driving means to feed said heads laterally either in the same or opposite directions, means operated by the lateral movement of one of said heads to vary the speed of said driving means and means operated by said feeding means to reverse said driving means at intervals.

9. In an engraving-machine, the combination with endwise-movable, rotary tool and tracer spindles and means to cause the longitudinal movements of said spindles to be interdependent, of pattern and work-carrying heads, a drive-shaft, driving means for said spindles carried thereby, means driven from said shaft to rotate said heads in the same or opposite directions comprising a reversing mechanism and a change-speed mechanism, independent lateral feeding means for said heads, actuating means for said feeding means driven by said head-rotating means, operative connections between said reversing mechanism and said actuating means, and means carried by one of said heads to actuate said change-speed mechanism, whereby the rotary speed of the heads is varied by the lateral feed of one of them.

10. In an engraving-machine, rotary pattern and work-carrying heads and endwise-movable tracer and tool spindles connected together so that their endwise movements are interdependent, in combination with alined shafts carrying worms for rotating the said heads, gears on the adjacent ends of said shafts, a single driving means for said gears, means to render one of said gears inoperative and to connect said shafts so that they are driven as one and means operated by one of said shafts to reverse said driving means at intervals.

11. In an engraving-machine, rotary pattern and work-carrying heads and endwise-movable tracer and tool spindles, connected together so that their endwise movements are interdependent, in combination with means to rotate said heads, and means driven by said rotating means to feed said heads laterally either in the same or opposite directions and means to vary the speed of rotation of said heads operated by the lateral feed of one of them.

12. In an engraving-machine, rotary pattern and work-carrying heads and endwise-movable tracer and tool spindles, connected together so that their endwise movements are interdependent, a worm-carrying shaft to rotate each of said heads, a disk driven by one of said shafts and carrying adjustable tappets, a rocking device in position to be actuated by said tappets, a double pawl-and-ratchet mechanism operatively connected to said rocking device, independent lateral feeding means for said heads operated by said mechanism and means to reverse the rotation of said heads operated by said rocking device.

13. In an engraving-machine, rotary pattern and work-carrying heads and endwise-movable tracer and tool spindles, connected together so that their endwise movements are interdependent, means to rotate said heads and means to feed them laterally, a rack carried by one of said heads, a shaft journaled in the frame of the machine and carrying at one end a pinion in mesh with said rack and at the other end a gear, a framework slidably mounted on the frame of the machine and having a rack in mesh with said gear, a cam-guide formed on said framework, a vertical slidable rod in engagement with said cam-guide and provided with rack-teeth, a change-speed mechanism forming part of the head-driving mechanism and carrying a gear in mesh with said rack-teeth, whereby the speed of rotation of said heads is varied by the lateral movement of one of them.

14. In an engraving-machine, the combination with the tool and tracer spindles, of rotary pattern and work-carrying heads, means to rotate said heads either in the same or opposite directions, comprising alined shafts, gearing to drive said shafts in opposite directions, a sliding clutch to disconnect one of said shafts from the driving-gearing and to connect it rigidly to the other shaft, and means operated by one of said shafts to reverse said driving-gearing at predetermined intervals.

15. In an engraving-machine, the combination with tracer and tool spindles, of pattern and work-carrying heads, means to rotate said heads either in the same or opposite directions, comprising alined shafts and means to drive them independently or as one, a tappet-disk driven by one of said shafts, pawl-and-ratchet mechanism operated by said tappet-disk and connections therefrom to feed said heads laterally either in the same or opposite directions and at the same or different speeds, means to reverse the rotation of said heads also operated by said tappet-disk and means to vary the speed of rotation of said heads operated by the lateral feed of one of said heads.

16. In an engraving-machine, the combination with the pattern and tool-carrying heads, of means to rotate the same, means operated by said rotating means to feed said heads laterally either in the same or opposite directions and either at the same or different speeds, reversing mechanism for said heads also operated by said feeding means, a cam-guide slidably mounted on the frame of the machine, operative connections between said guide and one of said heads, whereby the lateral feed of the latter is caused to move the former a speed-changing mechanism in the driving-train for rotating said heads and connections between said mechanism and said cam-guide; whereby the lateral feed of one of said heads varies the speed of rotation of both heads.

17. In an engraving-machine, the combination with pattern and work-carrying heads, of driving mechanism for the same, a tappet-disk driven by said driving mechanism, a rocking lever in position to be actuated by said disk, reversing mechanism for said heads operated by said rocking lever, means to feed said heads laterally, comprising independent feed-screws, a shaft to drive each screw, intermeshing change-gears on the ends of said shafts, a forked connecting-rod embracing one of said gears and connected at its other end to said rocking lever, a pawl pivoted in one arm of the fork and engaging one of said change-gears, a lever pivoted loosely on the shaft of said gear and pivoted at one end to the other arm of said fork, a pawl pivoted to the other end of said lever and also engaging said gear, and a supporting-arm for said fork carried by said shaft, whereby the lateral feed of said heads is unchanged by the reversal of rotation thereof.

In testimony whereof I have affixed my signature in the presence of two witnesses.

HENRY PHILLIPS.

Witnesses:
  E. C. NEWCOMB,
  JAS. C. TUCKER.